United States Patent [19]
Mass

[11] Patent Number: 5,871,181
[45] Date of Patent: Feb. 16, 1999

[54] ARTIFICIAL SATELLITE COMMUNICATION SYSTEM

[76] Inventor: Jonathan Mass, 111 Hagalil Street, 32 683 Haifa, Israel

[21] Appl. No.: 886,228

[22] Filed: May 21, 1992

[30] Foreign Application Priority Data

Jul. 19, 1991 [IL] Israel .......................................... 98893

[51] Int. Cl.[6] ............................... B64G 1/10; B64G 1/22; H04B 7/185

[52] U.S. Cl. .................................... 244/158 R; 455/12.1; 342/352

[58] Field of Search ........................ 244/158 R; 342/352, 342/358, 359, 360; 455/11.1, 12.1, 13.1, 13.2, 13.3; 379/59, 60

[56] References Cited

U.S. PATENT DOCUMENTS

| | | | |
|---|---|---|---|
| 3,243,706 | 3/1966 | Grisham | 244/158 R |
| 4,809,935 | 3/1989 | Draim | 244/158 R |
| 4,854,527 | 8/1989 | Draim | 244/258 R |

FOREIGN PATENT DOCUMENTS

0017597  10/1980  European Pat. Off. ........... 244/158 R

OTHER PUBLICATIONS

David Luders "Satellite Networks for Continuous Zonal Coverage" Feb. 1961 ARS Journal pp. 179–184.
Beste Design of Satellite Constellations for Optimal Continuous Coverage. May 1978 pp. 466–473.
Draim Satellite Constellations for Optimal Northern Hemisphere Coverage Oct. 1983.
Walker Circular Orbit Patterns Providing Continuous Whole Earth Coverage Nov. 1970.

*Primary Examiner*—Virna Lissi Mojica

[57] ABSTRACT

A communication system including a constellation of a plurality of artificial satellites orbiting the Earth, each artificial satellite having communication apparatus providing communication with the Earth, characterized in that the plurality of artificial satellites are in triply-geosynchronous (TGS) orbits having a period of eight sidereal hours, or twice-triply-geosynchronous (TTGS) orbits having a period of sixteen sidereal hours, which orbits are inclined with respect to the Equator and synchronized with the Earth's rotation such as to exploit the natural spacing of approximately 120° in longitude of the major land masses of Europe, North America and the Far East for communication with the artificial satellites to provide for higher elevation angles in such land masses than in other areas.

22 Claims, 13 Drawing Sheets

EUROPE VIEWED FROM SPACE WITH CONTINUOUS COVERAGE ZONE FOR z<34° WITH 24 SATELLITES. CIRCLES EVERY 20 MINUTES. ORBIT AS IN FIG. 3.

FIG. 4

NORTH AMERICA VIEWED FROM SPACE WITH CONTINUOUS
COVERAGE ZONE FOR z<34° WITH 24 SATELLITES.
ORBIT AS IN FIG. 3. CIRCLES EVERY 20 MINUTES.

EAST ASIA VIEWED FROM SPACE WITH CONTINUOUS COVERAGE ZONE FOR z<34° WITH 24 SATELLITES. ORBIT AS IN FIG. 3. CIRCLES EVERY 20 MINUTES.

FIG. 10

N. AMERICA VIEWED FROM SPACE. ORBIT AS IN FIG. 11 CIRCLES 30'
COVERAGE ZONE MARKED FOR:
--- 8 SETS (3 HR. SPACING), z=34°

ARTIFICIAL SATELLITE COMMUNICATION SYSTEM

FIELD AND BACKGROUND OF THE INVENTION

The present invention relates to a communication system comprising a constellation of a plurality of artificial satellites orbiting the Earth, and particularly to a communications system for use with mobile stations and land vehicles.

Fixed (as distinguished from mobile) ground stations communicating with satellites usually have their antennas in specially selected locations where an undisturbed line-of-sight to the satellite exists. In contrast, mobile stations (e.g., in land vehicles) have to be able to communicate from almost anywhere and so could be severely affected by shadowing from mountains and buildings and by propagation impairments due to foliage. These effects are severe at the low elevation look-angles to the satellite, especially in the northern latitude countries, looking at a satellite in geostationary orbit. The low elevation angles also cause multipath fadings and distortions making communication difficult; they may also cause interference with terrestial communications.

Satellite-based systems for communication with mobile stations, such as ships, aircraft or vehicles, are well-known, in use, or being developed. Examples are the INMARSAT-MARISAT network, the planned M-SAT in the USA, and location and data-communication systems like GEOSTAR, OMNITRACS, and ESA-PRODATA. All these systems use equatorial geosynchronous satellites (i.e., having 24-hour orbits) which are almost fixed in the sky relative to an Earth station. However, equatorial orbits produce low elevation angles at the higher latitudes where most of the highly developed areas of Europe, North America and Japan are located, thus making them disadvantageous for use with mobile ground stations which require high elevation angles as indicated above. High elevation angles also make it possible to use simpler upward-pointing antennas on the mobile ground stations, and simpler satellite antennas, and also reduces interference with communication links on land.

Non-equatorial orbits are also known. A doubly geosynchronous (12-hour) inclined elliptical orbit was first used by the USSR-MOLNIYA satellites to obtain coverage at all latitudes of the country. The constellation required three satellites, each being used for eight hours in one out-of-two orbits, the second orbit passing over the Pacific Ocean without being useful. Proposals for using similar inclined elliptical 12-hour orbits are being studied mainly to improve communications at higher latitudes and also to relieve congestion of the geosynchronous orbit; examples of such latter constellations include the German LOOPUS, the British T-SAT proposals and the ESA-ARCHIMEDES concept. Another elliptical inclined orbit is the ESA-proposed TUNDRA, which is a 24-hour orbit at higher apogee altitudes, similar also to the French SYCOMORES proposal.

Elliptical orbits are usually inclined about 63.4° to the Equator for minimizing the fuel requirements to avoid perigee drift. For best coverage of the northern hemisphere, the perigee is kept at the most southern point of the orbit, and drifts in longitude can be adjusted by changes in the orbit period. However, constellations of three (or four) satellites would provide continuous communication only in the European area at an elevation angle of about 60°, which elevation angle would drop to about 45° if the Middle East and North Africa are included. In order to cover also North America and the Far East, nine to twelve satellites would be required.

Recently, MOTOROLA proposed the IRIDIUM global mobile communication system using a constellation of 77 satellites in low earth orbits at about 765 Km altitude. However, such a constellation could assure continuous world-wide mobile communication with an elevation angle of only 20° in the middle latitudes, and even down to only about 10° globally. It appears that for higher elevation angles, an impractically large number of satellites would be required. Other proposals were also recently made using low Earth orbits and similar large constellations with low elevational angles.

OBJECTS AND BRIEF SUMMARY OF THE INVENTION

An object of the present invention is to provide a communication system having advantages over the above-mentioned communication system, and particularly over the proposed IRIDIUM and other low Earth orbit global mobile communication systems, in that it enables continuous substantially world-wide mobile communication with a substantially larger elevation angle and a substantially smaller number of satellites.

According to the present invention, there is provided a communication system comprising a constellation of a plurality of artificial satellites orbiting the Earth, each artificial satellite having communciation means providing communication with the Earth, characterized in that the plurality of artificial satellites are in orbits inclined with respect to the Equator and synchronized with the Earth's rotation such as to exploit the natural spacing of approximately 120° in longitude of the important land masses of Europe, North America and the Far East for communication with the artificial satellites to provide for higher elevation angles in such land masses than in other areas.

According to further features, the nodal period of such satellites may be about 28,720 seconds, slightly less than eight hours. They have sub-satellite tracks fixed on Earth, and will be called triply-geosynchronous, or TGS, orbits having a period of eight sidereal hours.

The TGS orbit exploits the fortunate circumstance that the highly developed areas of Europe, North America and Japan are separated from each other by about 120° in longitude. Such a TGS orbit can thus have ground tracks that pass, on every orbit, one of the three important land masses of Europe, North America or the Far East, thereby making possible continuous satellite communication services at very high elevation angles in all three areas with a minimum number of satellites, while all other areas can also be served but at somewhat lower elevation angles.

The possibility of using circular orbits with a period of eight or 16 sidereal hours has been mentioned in the literature (Walker, 1984) in the context of comparing orbits of many possible periods i.e. 6, 8, 12, 20, 24, 30, and 36 hours, from the point of view of minimum angular distance between an Earth station and the nearest satellite in a constellation. The study did not refer to the possibility of adapting the orbits to the distribution of land masses or populations on Earth, nor to elliptical orbits.

The TGS orbits could be circular as illustrated for instance in FIGS. 1–6, or elliptical as illustrated for instance in FIGS. 7–12, and would in both cases exploit the geographical pecularity of the mentioned distribution of the land masses of the Earth. The altitude of the circular orbit would be about 13,900 Km. The semiaxis of the orbit would in both cases be about 20,270 Km and could be so adjusted that sub-satellite tracks of all the satellites would be practically fixed. This adjustment could correct, on the average, any longitudinal drifts of the orbits expected from any perturbations. The Equator-crossing Right Ascensions of the satellites and their timing would be spaced so as to ensure an identical subsatellite track for all satellites, and would be fixed in such a way as to be optimal for the desired stay over the desired area.

Satellite orbits could also be used having a period of two-thirds of a sidereal day, that is slightly less than 16 hours. Such orbits have similar characteristics as the TGS (eight-hour) orbits, in that they also provide best communication conditions in areas spaced 120° in longitude. These orbits will be called twice triply-geosynchonous, or TTGS, orbits. Their semiaxis is about 32,177 Km, and the altitude for the circular orbits is about 25,800 Km.

The above TGS and TTGS orbits for the satellites provide a large number of advantages over the previously used or proposed systems. Thus, with respect to the low earth orbit system (e.g., the proposed MOTOROLA IRIDIUM), the novel TGS and TTGS systems require a much smaller number of satellites, provide much higher elevation angles of the line-of-sight to the satellite, and require less frequent cell-switching for mobile stations because of the smaller velocity of the ground tracks of the satellites.

With respect to the inclined geosynchronous (24-hour orbit) systems which could also provide high elevation angles, the novel systems require fewer satellites for the Northern Hemisphere at high-angle coverage, and smaller-gain antennas on the satellites. In addition, they avoid crowding of the geostationary orbit. Further, they may make frequency reuse possible at high latitudes with satellites in geosynchronous orbits (GEO), which inherently operate at low elevation angles only, at the high latitudes.

With respect to the elliptical 12-hour orbit system (e.g., MOLNIYA, LOOPUS), as well as the elliptical 24-hour orbit system (e.g., TUNDRA), the novel system requires fewer satellites for world-wide or hemisphere coverage, smaller-gain antennas, and less energy per launch.

Several embodiments of the invention are described below for purposes of example. In one described embodiment, the constellation includes 12 satellites in circular TGS orbits at approximately 13,900 Km altitude spaced 30° apart in Right Ascension and two hours apart in time of the Equator crossings. In a second described embodiment, the constellation includes 24 satellites in circular TGS orbits at about 13,900 Km altitude spaced one hour apart in time of the Equator crossings and 15° apart in Right Ascension. Actually, the communication system could start out with a constellation of 12 satellites in circular orbits according to the first-mentioned embodiment, and then be upgraded gradually to the latter embodiment by subsequently adding further satellites.

A further embodiment includes 12 satellites in circular 12-satellite TTGS (16-hour) orbits, at an altitude of approximately 25,800 Km, in six inclined orbital planes containing two satellites each.

According to a further embodiment, the constellation includes eight satellites in "skewed" elliptical orbits, inclined 63.4° and spaced three hours apart in Equator crossings and 45° apart in Right Ascension. The elliptical orbits in the given example (FIGS. 7–11) have an apogee altitude of about 26,790 Km and a perigee altitude of 1,000 Km, the perigee being offset to a perigee angle of −134° (relative to the S-N Equator crossings in the orbit plane).

Figure 12:
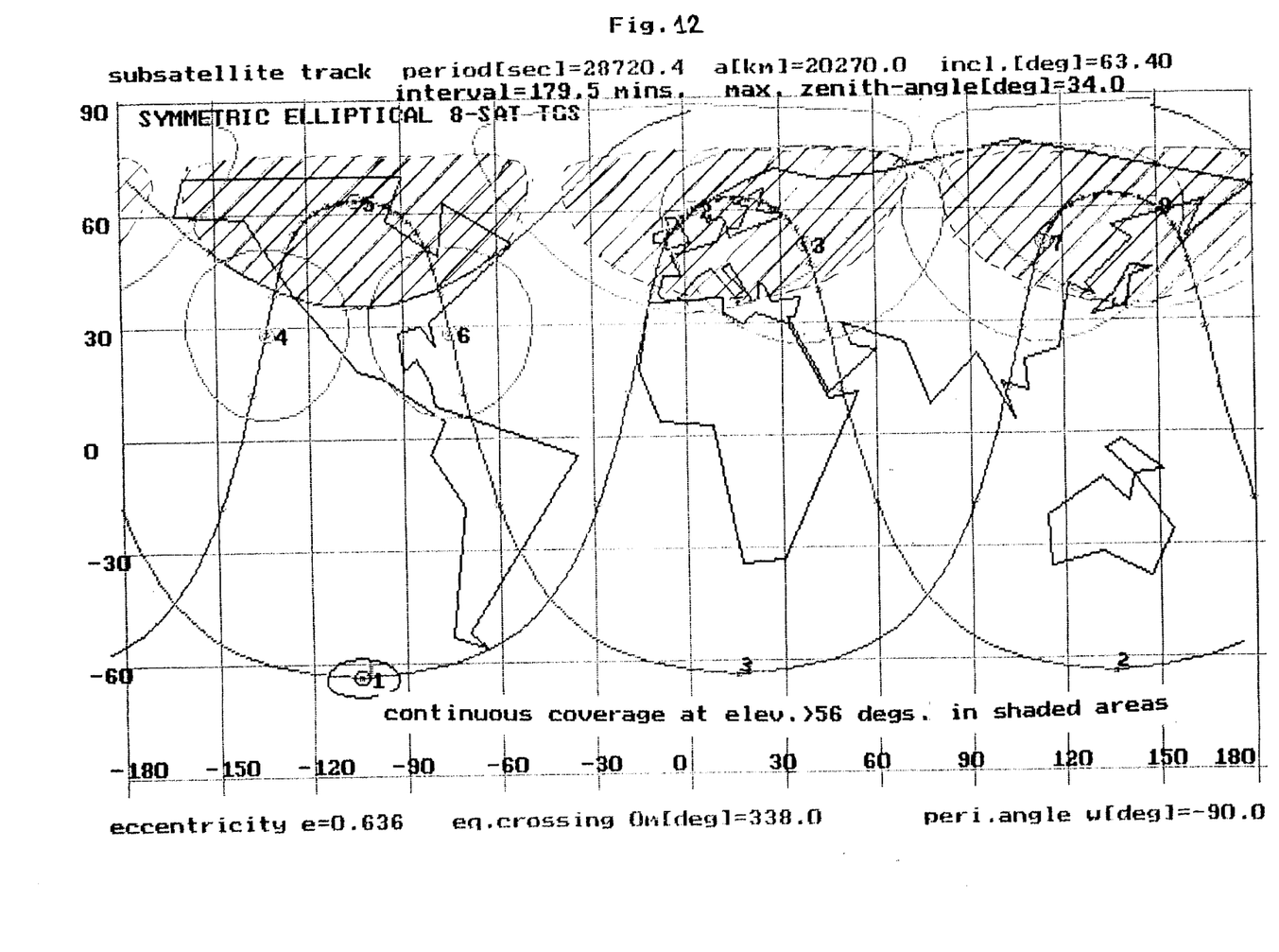
FIG. 12 shows results obtainable with a "straight" 8-satellite elliptical TGS constellation, specifically the areas of elevation angles greater than 56°.

A further embodiment uses eight satellites in "straight" elliptical TGS orbits, that is having the perigee angle at −90° as in FIG. 12.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

As described earlier, the TGS and the TTGS orbits have the advantage that they cover most of the world's population areas with possibilities of high-elevation angle communication, which is particularly suitable for communication with land-mobile stations. In the circular constellations, one is free to choose an optimal inclination of the orbit to be traded off with required maximal elevation angles and coverage.

Figure 1:
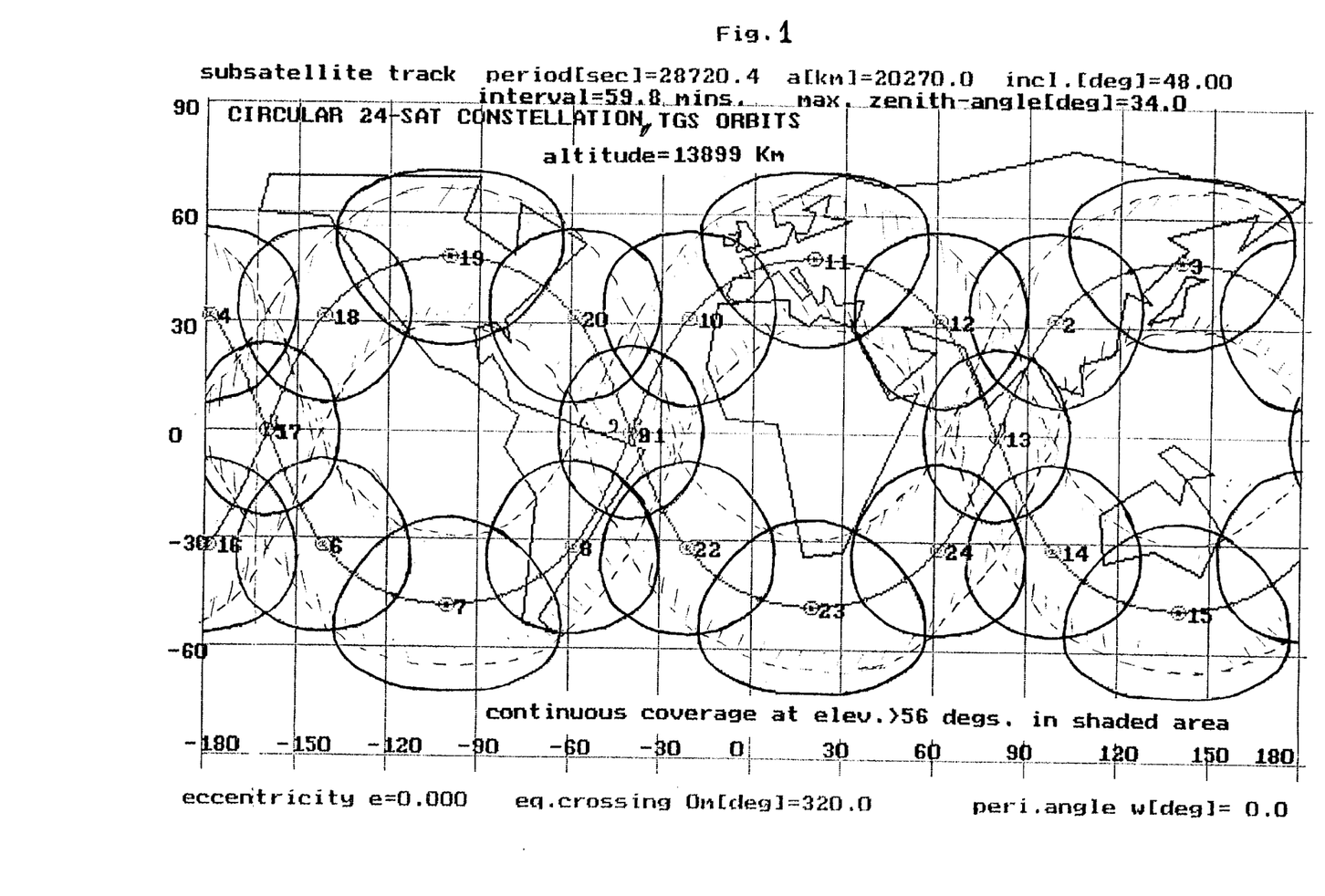
FIGS. 1 and 2 and FIGS. 4–6 show results for large-elevation-angle areas obtainable with a 24-satellite circular TGS constellation.

FIG. 1 illustrates a 24-satellite constellation of TGS circular, inclined orbits at an inclination of i=48°, and an altitude h=13,899 Km. This figure shows the subsatellite track of all satellites and the instantaneous positions of the 24 satellites giving a continuous world-wide communication network, and the limits of the zones in which an elevation angle of at least 56° is provided (i.e., the zenithal angle is less than 34°), continuously for 24 hours. Outside these limits, communication with the satellites is possible but at lower elevation angles, as in FIG. 2.

Figure 2:
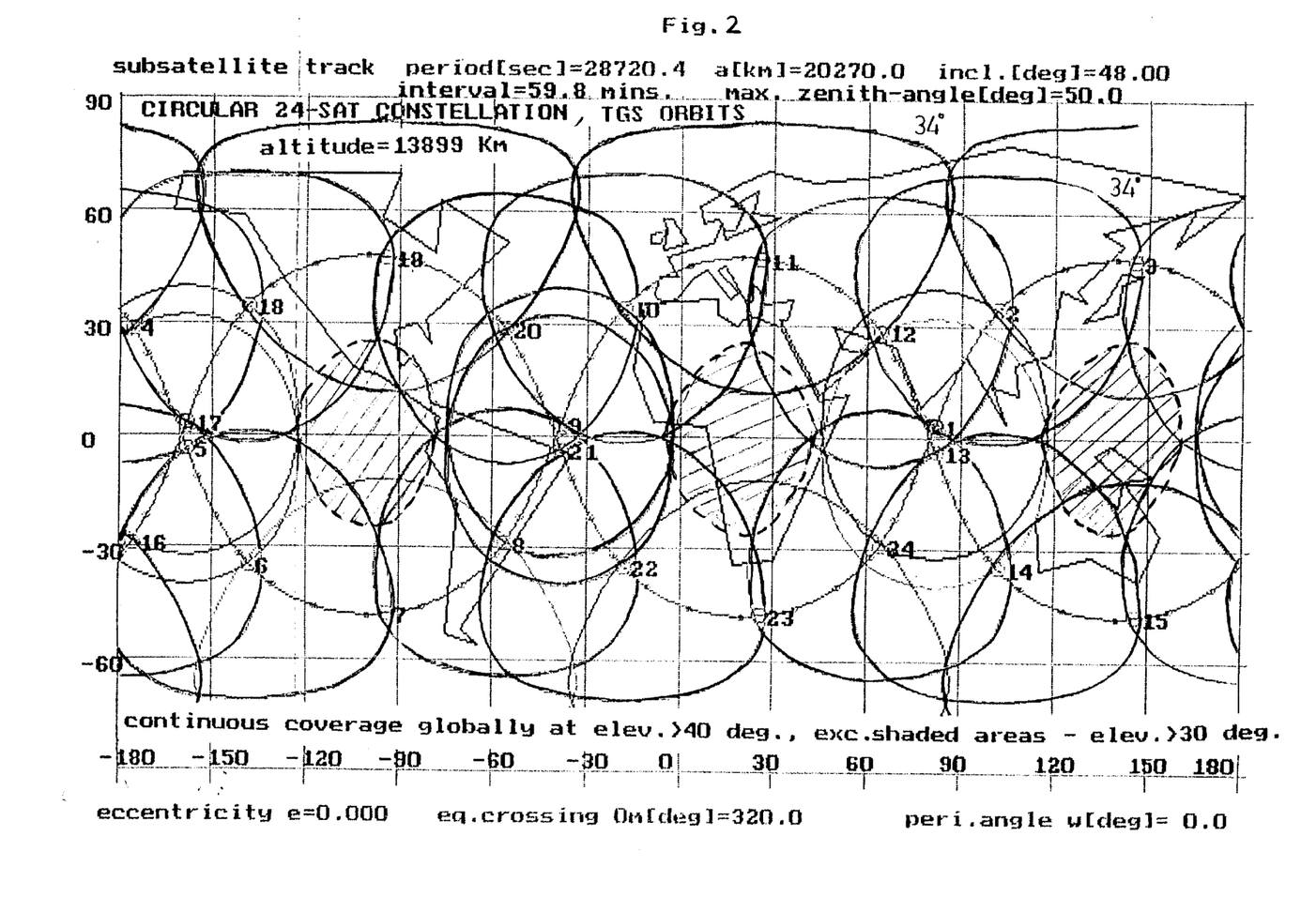

FIG. 2 illustrates the fact that the 24-satellite constellation of FIG. 1 can give elevation angles of 40°, globally and continuously, except for three small areas over the Pacific, over Central Africa and over Indonesia and North Australia, where they get as low as about 30°; and except for the polar regions where the lowest elevation angle is about 32°, in three azimuths simultaneously.

Figure 3:
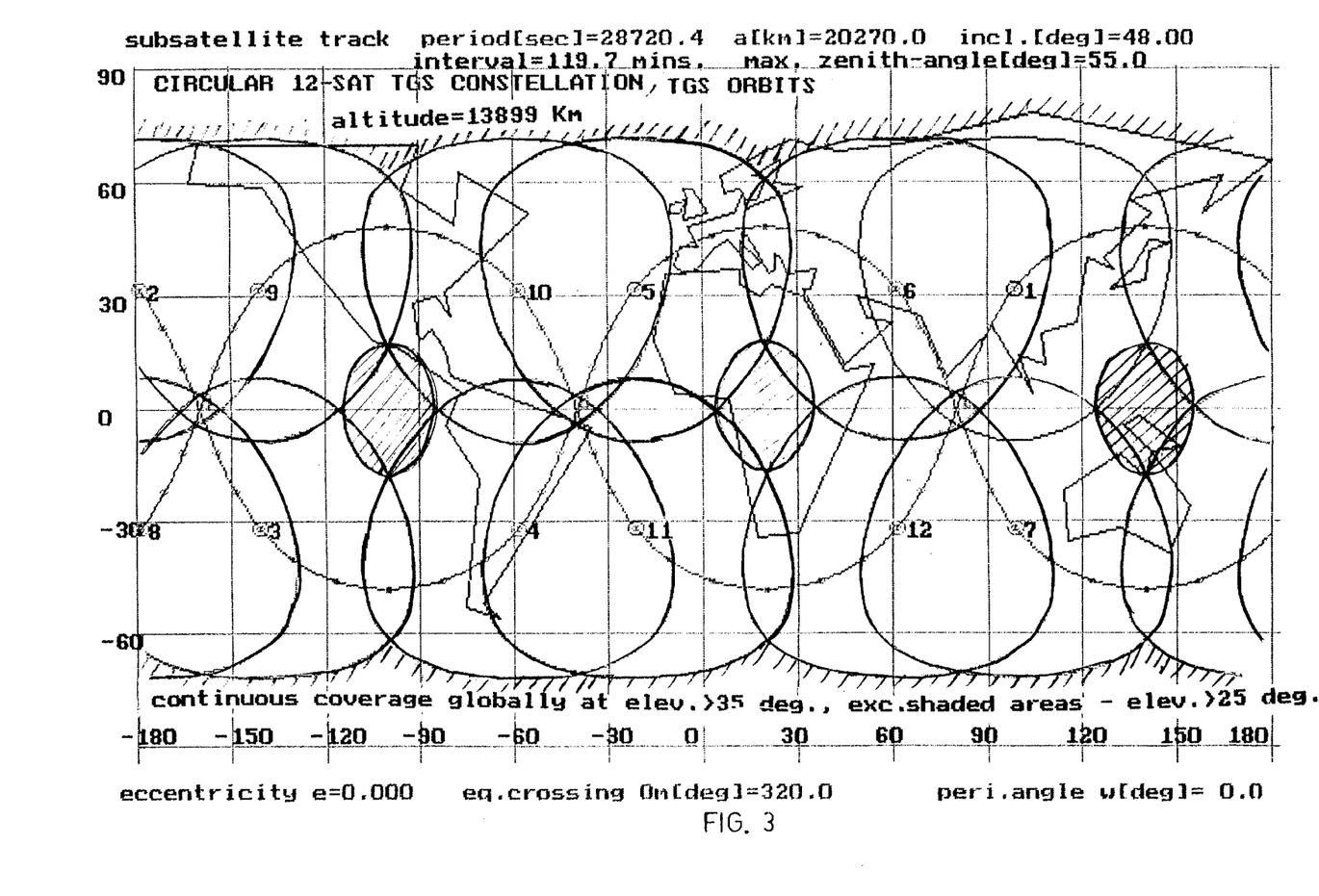
FIG. 3 shows results obtainable with a 12-satellite TGS constellation.

FIG. 3 illustrates the result for a 12-satellite circular TGS constellation, using orbits inclined by 48° and spaced 30° apart in Right Ascension and two hours apart in times for the satellites' Equator crossings. One can obtain elevation angles of better than 35° almost globally, except for three small areas (Central Africa, Indonesia and the Pacific) and the polar areas where elevation angles will be larger than 25°.

Figure 4:
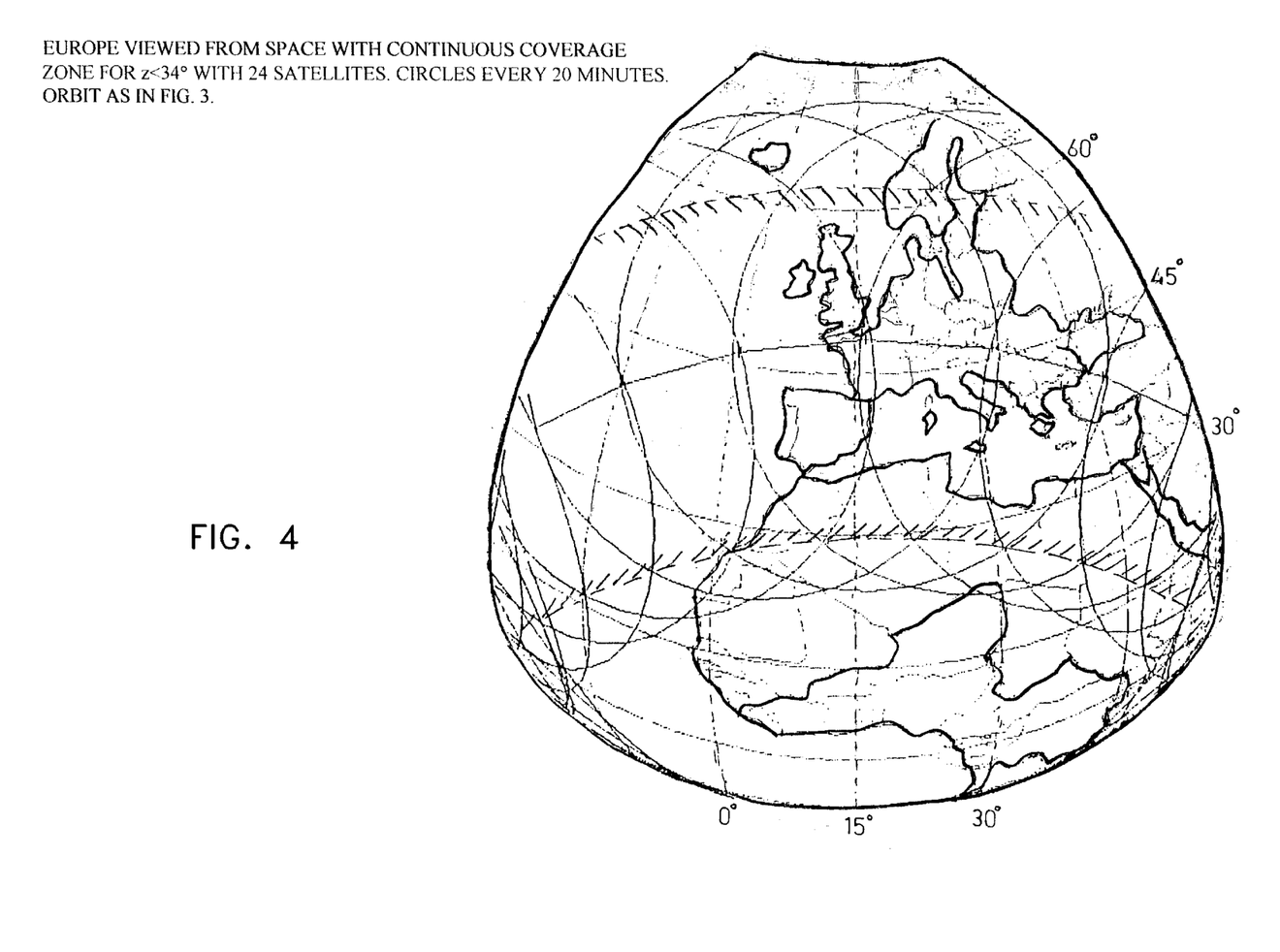
Figure 5:
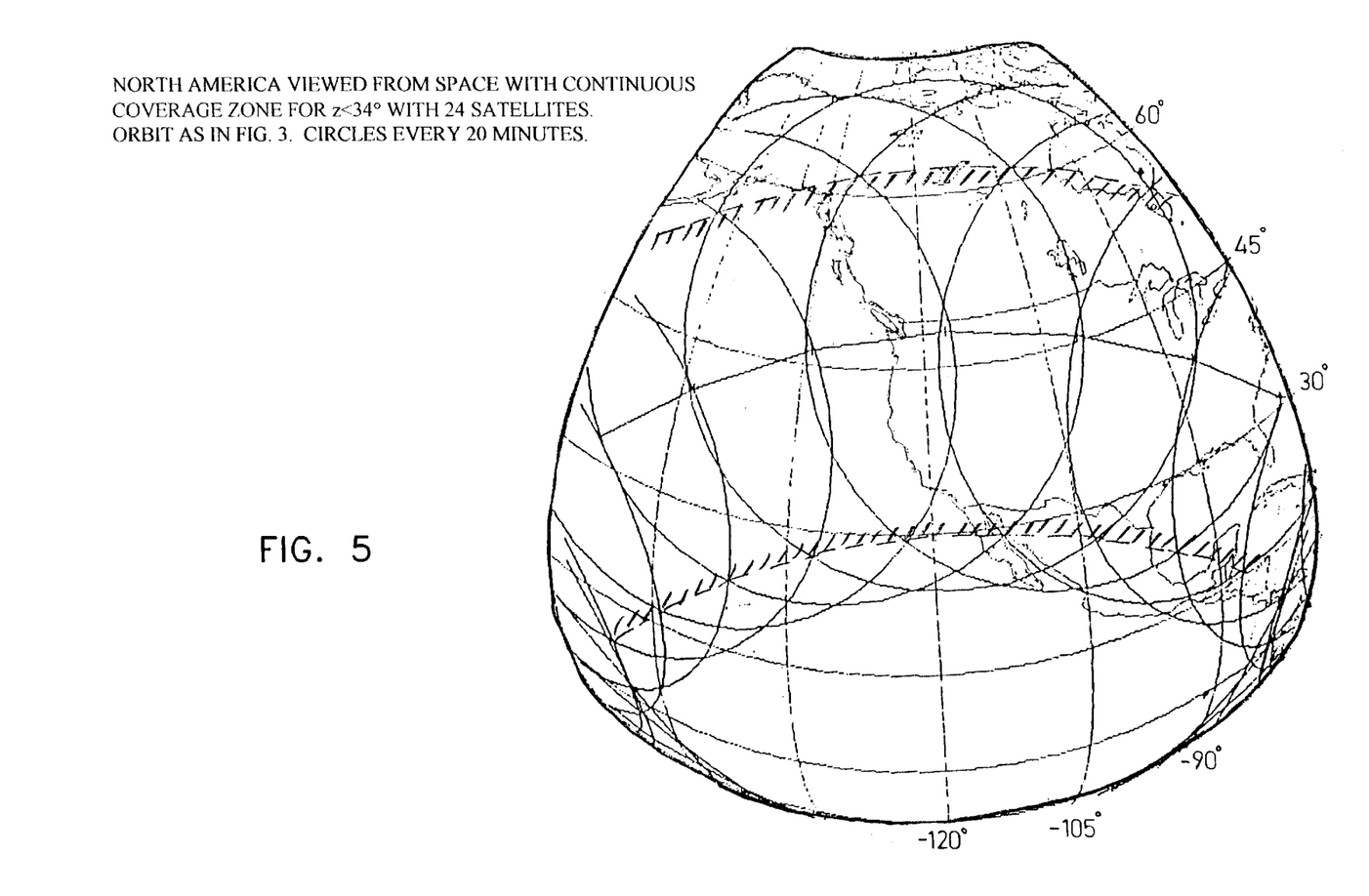
Figure 6:
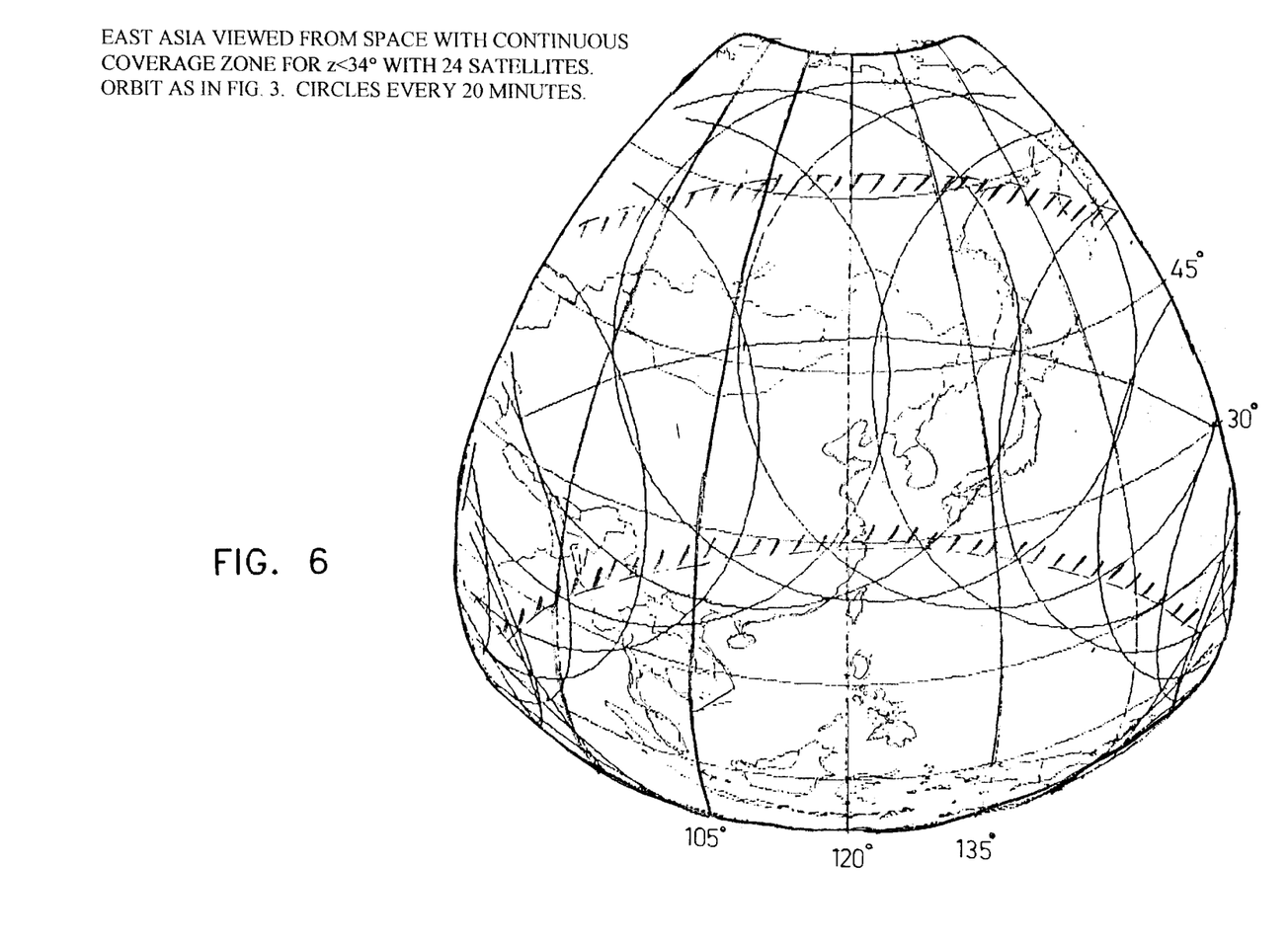

FIGS. 4, 5, and 6 show enlarged views of the elevation-angle limits of 56° for the 24-satellite constellation of FIG. 1, for Europe, North America and the Far East, respectively.

Figure 7:
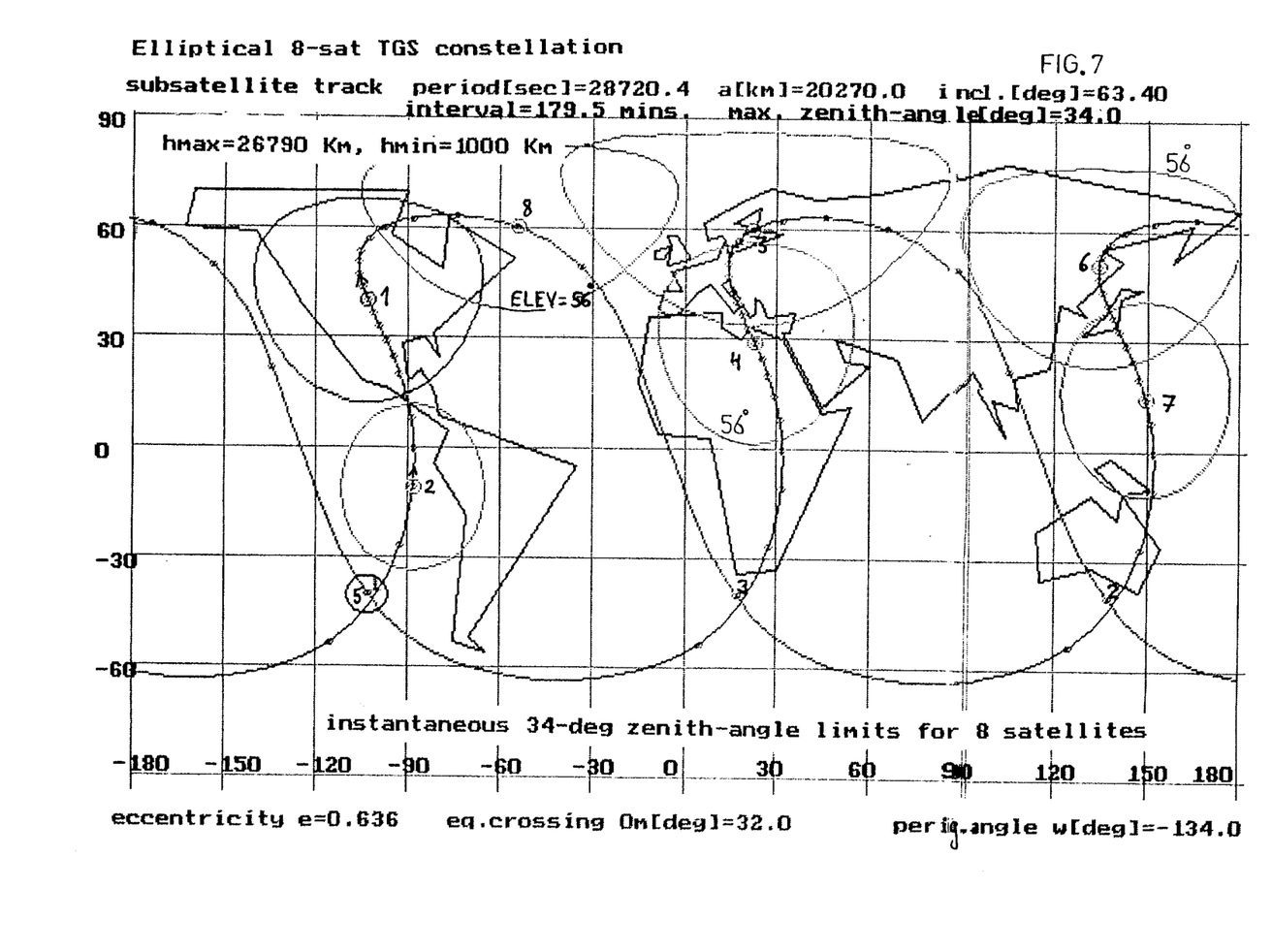
FIGS. 7–11 show results obtainable with a "skewed" 8-satellite elliptical TGS orbit, specifically the areas within which the elevation of the look-angles to one of the satellites will always be larger than 56°.

FIG. 7 shows the subsatellite tracks of an 8-satellite elliptical TGS constellation in orbits inclined 63.4°. The orbits are "skewed" because the perigee angle chosen is −134° which places the apogee over 40° of latitude North. This causes the increase of the time the satellite spends over the middle latitudes of 30° to 50° North. This can be compared with FIG. 12, which shows results for a similar "straight" constellation, but which has the perigee angle of −90° and thus an apogee over 63.4° North.

All eight satellites cover the same subsatellite track if properly spaced, i.e., 45° in Right Ascension and one-eighth of a sidereal day (slightly less than three hours) in times of Equator crossings. Shown are instantaneous positions of eight satellites and the areas within which the elevation angles from the earth to the satellites are greater than 56°.

Figure 8:
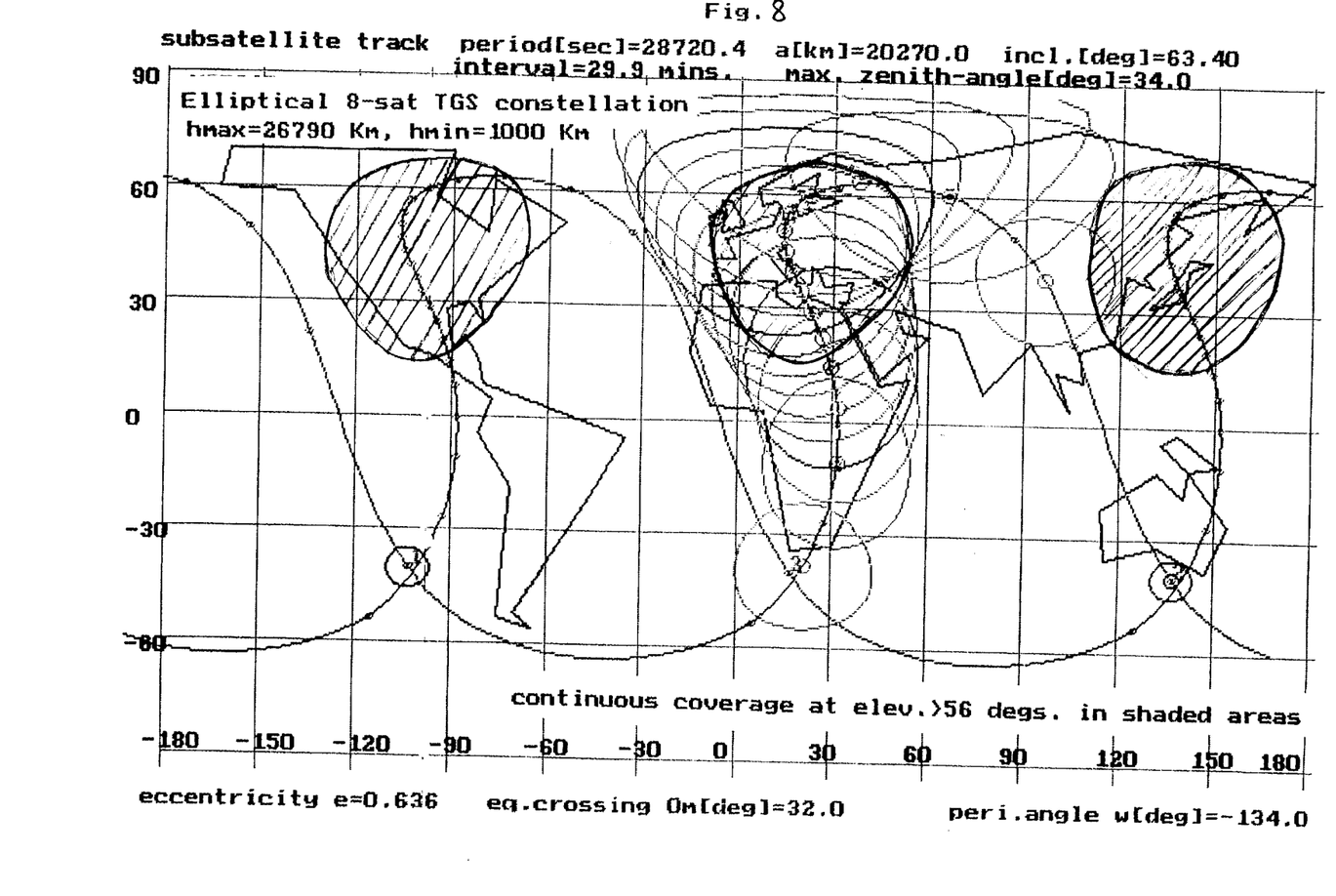

FIG. 8 illustrates the same 8-satellite elliptical TGS constellation as in FIG. 7. Here the limits of the areas of elevation angles greater than 56° are shown for a single satellite as it moves along its path, every half hour. Also shown are the limits of the continuous-coverage areas at elevation angles above 56°. These are obtained by the overlapping of every sixth footprint simulating adjacent satellites separated by three hours on the same subsatellite track. The areas of 56° elevation increase as the satellite rises towards the apogee. In order to make full use of these areas the satellite antenna patterns have to be changed with time or alternatively, have to be designed for the apogee conditions and made so that as the satellite descends, the loss at the edges of the antenna footprint is compensated by the decreased gain required at the smaller distances.

Figure 9:
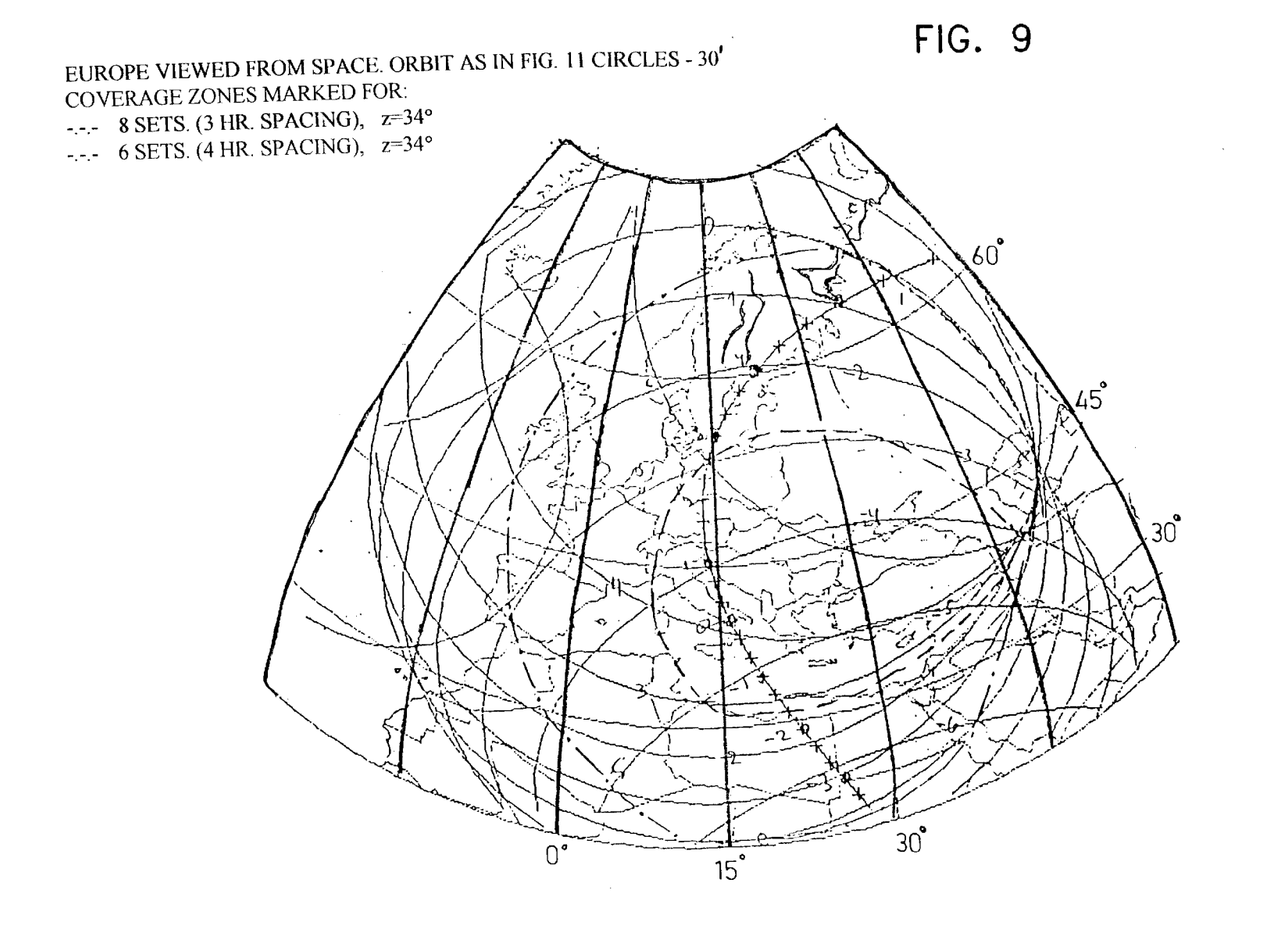
Figure 10:
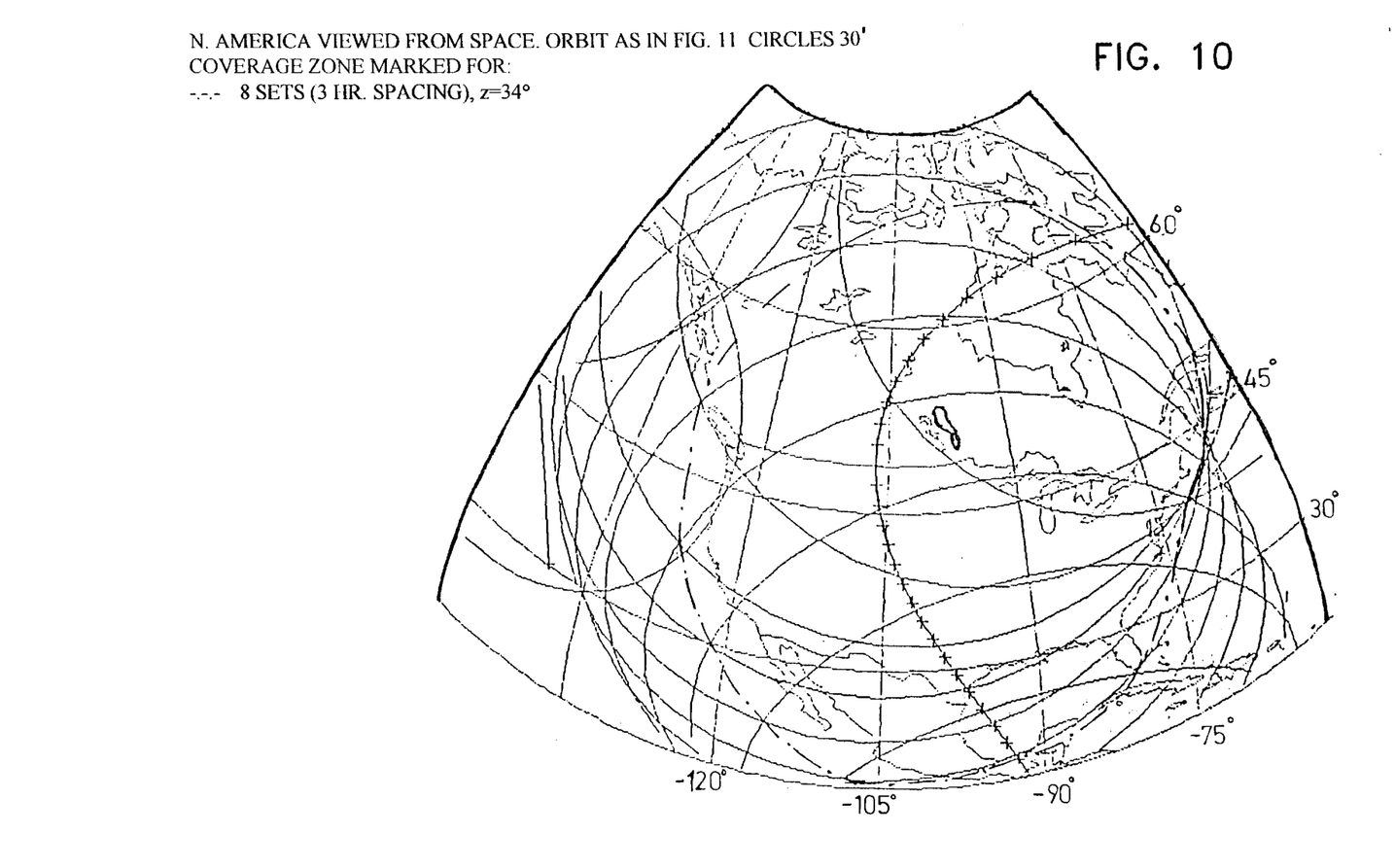
Figure 11:
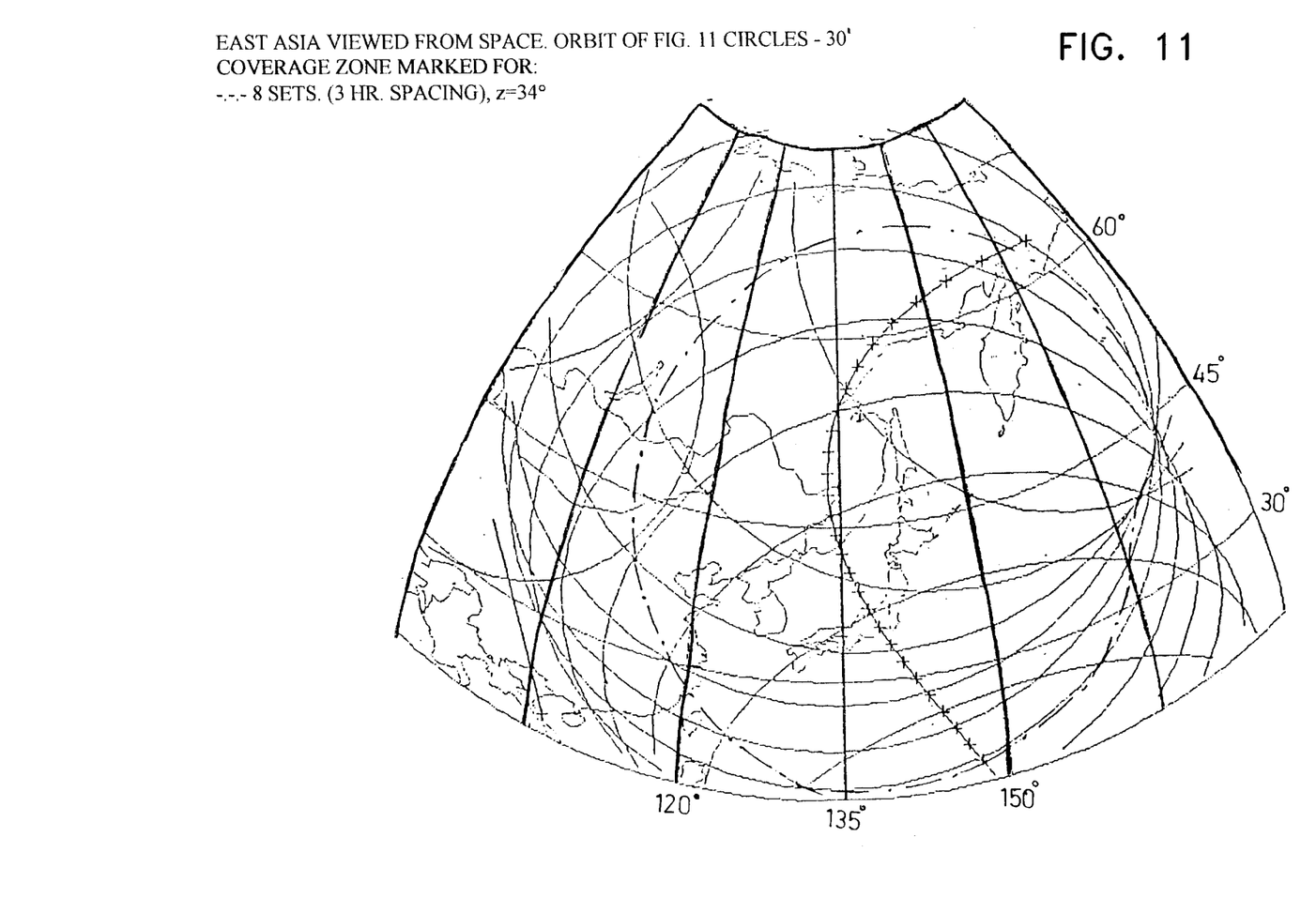

FIGS. 9–11 show magnified views of the areas of continuous coverage with the 8-satellite elliptical TGS constellation of FIG. 8 for Europe, North America and the Far East respectively.

FIG. 12 shows the elevation-angle areas of better than 56° continuously for a "straight" 8-satellite elliptical TGS orbit—that is, for orbits with an inclination of 63.4° and with a perigee angle of −90°, thus having its apogee over 63.4° north latitude. It shows that the coverage for 56° elevation is more extended northwards, relative to "skewed" orbits as in FIGS. 7 and 8, but at the expense of not including the most important areas of the southern parts of the USA, North Africa and the Middle East nor southern Japan and North China. In order to cover these, elevations down to 45° must be tolerated in this configuration.

An orbit inclination of 63.4° was chosen in order to keep the apogee in the desired part of the orbit without undue expenditure of fuel (the same inclination as the MOLNIYA orbit). In this case also, as in the TGS inclined circular orbit, the TGS elliptical orbit has the advantage of having its three Northern Hemisphere loops over the highly-developed areas of Europe, North America and Japan because of the fortunate circumstance of their being separated from each other by about 120° in longitude. This is of special interest for land-mobile communications, and in fact for any communication system benefiting from high elevational angles over the populated land masses in the Northern Hemisphere, as compared to the 12-hour orbit (MOLNIYA), where one orbit out of every two is practically unusable as it peaks over the Pacific Ocean.

Figure 13:
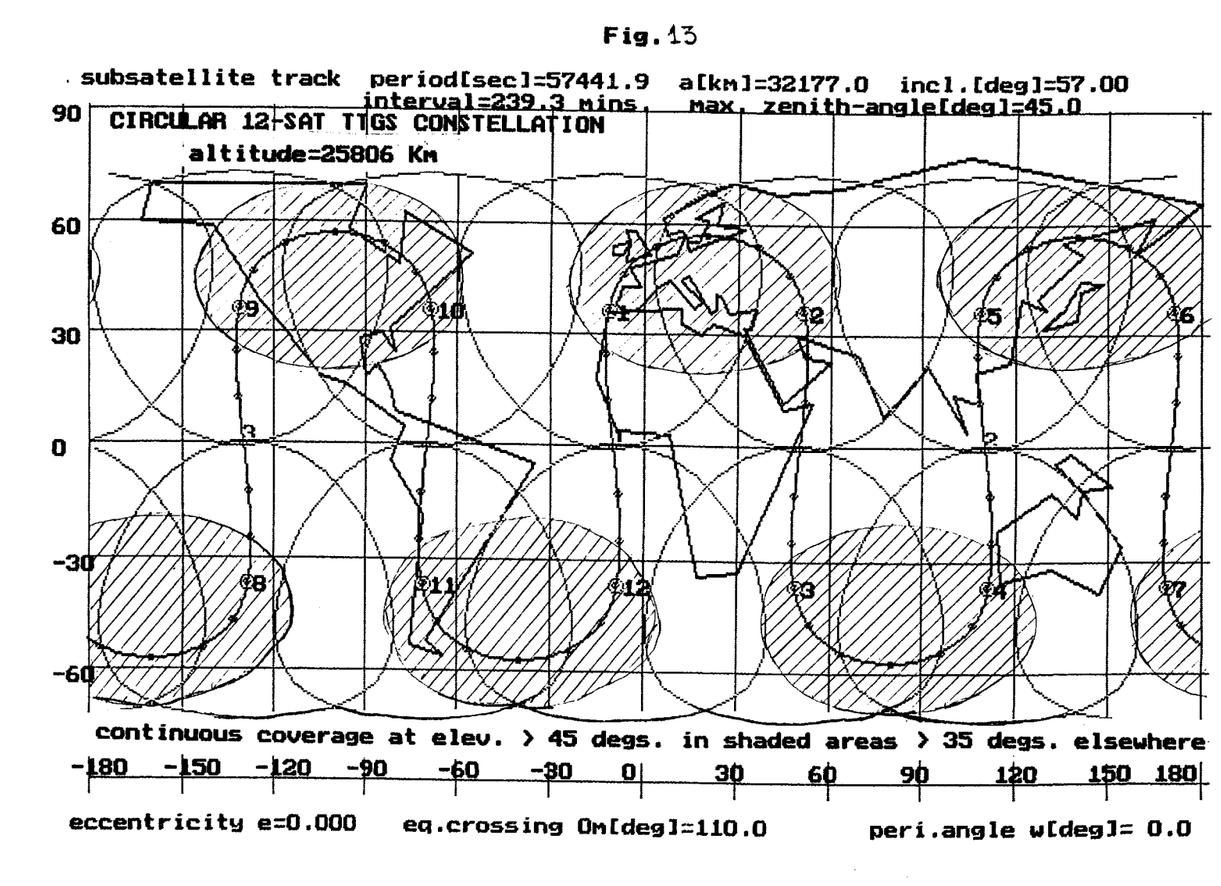
FIG. 13 shows results obtainable with a 12-satellite TTGS constellation, specifically the areas with elevation angles greater than 45°, continuously and instantaneously.

FIG. 13 shows the sub-satellite track of 12 satellites in a TTGS (slightly less than 16 hours) orbit. The satellites are in six orbit planes inclined 57°, spaced 60° in Right Ascension with two satellites in each plane spaced 180° apart in the orbit plane and phased so that the Equator crossings of the satellites at the three longitudes of 130W, 10W and 110E are spaced by slightly less than four hours, nearly one-sixth of a sidereal day, about 239.3 minutes. Each satellite returns to the same position over the Earth after three revolutions, that is after two sidereal days. This constellation gives continuous coverage at elevation angles greater than 45° over North America, Europe and the Far East and parts of South America, while for global coverage one requires elevation angles down to 35°.

A shift of perigee angle from the extreme latitude making the orbit "skewed" (asymmetrical) in order to prolong the time spent by the satellite over certain desired areas is also feasible with elliptical orbits of any period or ellipticity. The perigee angle, measured in the orbit plane from the Equator plane crossing to the perigee, usually chosen to be ±90° to create a "straight" (symmetric) subsatellite track, could be any other angle between 0° and ±180° in order to shift the apogee of the orbit to a desired latitude, making the subsatellite track asymmetrical, without compromising the stability of the orbit parameters. An example of the improved coverage obtainable with "skewed" (asymmetric) elliptical orbits is given in FIG. 7, relative to FIG. 12, for a TGS (8-sidereal-hour) orbit. In this case the perigee angle was set at −134°.

The triply-geosynchronous (TSG) and twice triply-geosynchronous (TTGS) constellations described can be used for the Radio-Location of fixed and mobile earth stations, using distance or velocity measurements to 2–3 satellites simultaneously in view, as for instance in the US GPS system. It can be shown, for instance, that the 24-satellite circular TGS constellation, as in FIG. 1, can provide for the visibility of at least three satellites simultaneously, anywhere on the globe, continuously at elevation angles greater than 25° to all three satellites.

While the invention has been described with respect to several useful embodiments, it will be appreciated that these are set forth merely for purposes of example, and that many other variations, modifications and applications of the invention may be made. Especially, the number of satellites in a constellation can be chosen so as to obtain the desired elevation angles continuously in the preferred area.

What is claimed is:

1. A communication system including a constellation of a plurality of artificial satellites orbiting the Earth, each artificial satellite having communciation means providing communication with the Earth, characterized in that the plurality of artificial satellites are in triply-geosynchronous (TGS) orbits having a period of eight sidereal hours, or twice-triply-geosynchronous (TTGS) orbits having a period of sixteen sidereal hours, which orbits are inclined with respect to the Equator and synchronized with the Earth's rotation such as to exploit the natural spacing of approximately 120° in longitude of the major land masses of Europe, North America and the Far East for communication with the artificial satellites to provide for higher elevation angles in such land masses than in other areas.

2. The system according to claim 1, wherein said orbits are inclined circular orbits.

3. The system according to claim 2, wherein said orbits are triply-geosynchronous (TGS) orbits having a period of eight sidereal hours.

4. The system according to claim 3, wherein the constellation includes 12 satellites at approximately 13,900 Km altitude in twelve orbital planes with ascending nodes 30° apart and crossing the Equator from South to North at intervals of two sidereal hours.

5. The system according to claim 3, wherein the constellation includes 24 satellites at approximately 13,900 Km altitude in twenty-four orbital planes with ascending nodes 15° apart and crossing the Equator from South to North at intervals of one sidereal hour.

6. The system according to claim 2, wherein said circular orbits are twice triply-geosynchronous (TTGS) orbits having a period of 16 sidereal hours.

7. The system according to claim 6, wherein the constellation includes 12 satellites at approximately 25,800 Km altitude, in six inclined orbit planes containing two satellites in each plane.

8. A communication system including a constellation of a plurality of artificial satellites orbiting the Earth, each satellite having communication means providing communication with the Earth; characterized in that the satellites are in inclined elliptical orbits having their perigee and apogee offset from the extreme latitudes so as to obtain longer stays of the satellites over predetermined areas in one hemisphere than would be possible with such elliptical orbits in which the perigee and apogee are not offset from the extreme latitudes.

9. The system according to claim 8, wherein the artificial satellites are inclined with respect to the Equator such as to exploit the natural spacing of approximately 120° in longitude of the important land masses of Europe, North America and the Far East for communication with the artificial satellites to provide for higher elevation angles in such land masses than in other areas.

10. The system according to claim 9, wherein said inclined elliptical orbits are twice triply-geosynchronous (TTGS) orbits having a period of 16 sidereal hours.

11. The system according to claim 9, wherein said inclined elliptical orbits are triply-geosynchronous (TGS) orbits having a period of eight sidereal hours.

12. A method of deploying a constellation of artificial satellites communicating with and orbiting the Earth, comprising placing a plurality of the artificial satellites in triply-geosynchronous (TGS) orbits having a period of eight sidereal hours, or twice-triply-geosynchronous (TTGS) orbits having a period of sixteen sidereal hours, which orbits are inclined with respect to the Equator and synchronized with the Earth's rotation, such as to exploit the natural spacing of approximately 120° in longitude of the major land masses of Europe, North America and the Far East for communication with the artificial satellites to provide for higher elevation angles in such land masses than in other areas.

13. The method according to claim 12, wherein said orbits are inclined circular orbits.

14. The method according to claim 12, wherein said orbits are inclined elliptical orbits.

15. The method according to claim 12, wherein said orbits are triply-geosynchronous (TGS) orbits having a period of eight sidereal hours.

16. The method according to claim 12, wherein said orbits are twice-triply-geosynchronous (TTGS) orbits having a period of sixteen sidereal hours.

17. The system according to claim 1, wherein said orbits are inclined elliptical orbits.

18. The system according to claim 17, wherein said orbits are skewed elliptical orbits such that their perigees are offset from the extreme latitudes in order to improve coverage over predetermined areas.

19. The system according to claim 18, wherein said constellation includes eight satellites in eight orbits, equally spaced in Right Ascension, the orbits having an apogee altitude of about 26,790 Km, a perigee altitude of about 1,000 Km, and a perigee angle of about −134 degrees relative to the S-N equator crossing as measured in the orbit plane.

20. The system according to claim 17, wherein said orbits are triply-geosynchronous (TGS) orbits having a period of eight sidereal hours.

21. The system according to claim 20, wherein the constellation includes a plurality of satellites at an apogee altitude of about 26,790 Km and a perigee altitude of about 1,000 Km.

22. The system according to claim 17, wherein said inclined elliptical orbits are twice-triply-geosynchronous (TTGS) orbits having a period of sixteen sidereal hours.

\* \* \* \* \*